United States Patent
Lucas et al.

(10) Patent No.: US 12,275,285 B2
(45) Date of Patent: Apr. 15, 2025

(54) METHOD FOR DETERMINING AN AXLE LOAD ON A MECHANICALLY SUSPENDED VEHICLE

(71) Applicant: ZF CV Systems Hannover GmbH, Hannover (DE)

(72) Inventors: Johann Lucas, Sehnde (DE); Andreas Thimm, Sarstedt (DE); Sebastian Jermis, Springe (DE); Britta Warnecke, Barsinghausen (DE)

(73) Assignee: ZF CV Systems Europe BV, Brussels (BE)

( * ) Notice: Subject to any disclaimer, the term of this patent is extended or adjusted under 35 U.S.C. 154(b) by 672 days.

(21) Appl. No.: 17/600,241

(22) PCT Filed: Apr. 20, 2020

(86) PCT No.: PCT/EP2020/060981
§ 371 (c)(1),
(2) Date: May 25, 2022

(87) PCT Pub. No.: WO2020/221613
PCT Pub. Date: Nov. 5, 2020

(65) Prior Publication Data
US 2022/0288991 A1 Sep. 15, 2022

(30) Foreign Application Priority Data
Apr. 30, 2019 (DE) ...................... 10 2019 111 187.0

(51) Int. Cl.
*B60G 17/015* (2006.01)
*B60G 17/016* (2006.01)
(Continued)

(52) U.S. Cl.
CPC ..... *B60G 17/0155* (2013.01); *B60G 17/0162* (2013.01); *B60G 17/017* (2013.01);
(Continued)

(58) Field of Classification Search
CPC ............ B60G 17/0155; B60G 17/0162; B60G 17/017; B60G 17/019; B60G 2300/02;
(Continued)

(56) References Cited

U.S. PATENT DOCUMENTS

| 5,088,762 A | 2/1992 | Fukuyama et al. |
| 6,185,439 B1 * | 2/2001 | Guerrero ................. H04M 3/36 |
| | | 455/560 |

(Continued)

FOREIGN PATENT DOCUMENTS

| CN | 101610927 A | 12/2009 |
| CN | 104937384 A | 9/2015 |

(Continued)

OTHER PUBLICATIONS

Machine translation of JP-08207544-A (Year: 1996).*
(Continued)

*Primary Examiner* — Navid Z. Mehdizadeh
*Assistant Examiner* — Caitlin R McCleary
(74) *Attorney, Agent, or Firm* — Dickinson Wright PLLC (57) ABSTRACT

A mechanically suspended vehicle has a travel measurement device (9), a control unit (10) and an algorithm stored in the control unit (10). The algorithm performs a method for determining an axle load. In a first test routine a level signal of a travel measurement device is acquired and evaluated, wherein, in a loading operation of the vehicle, a loading curve (F_i) is determined, and, in an unloading operation of the vehicle, an unloading curve (F_u) is determined. The values of the two curves are used to calculate an averaged load-travel characteristic curve (F_m) to be stored in the control unit. After each start of the vehicle, an axle load determination routine is repeated cyclically, and axle load values are continuously determined with the averaged load-travel characteristic curve (F_m). An axle load average value
(Continued)

is calculated from the axle load values and displayed as the current axle load value.

16 Claims, 4 Drawing Sheets

(51) Int. Cl.
*B60G 17/017* (2006.01)
*B60G 17/019* (2006.01)

(52) U.S. Cl.
CPC ........ *B60G 17/019* (2013.01); *B60G 2300/02* (2013.01); *B60G 2400/104* (2013.01); *B60G 2400/252* (2013.01); *B60G 2400/60* (2013.01)

(58) Field of Classification Search
CPC ........ B60G 2400/104; B60G 2400/252; B60G 2400/60; B60G 17/0161; G01G 19/08
See application file for complete search history.

(56) References Cited

U.S. PATENT DOCUMENTS

| | | | | |
|---|---|---|---|---|
| 2001/0013432 | A1* | 8/2001 | Kawaguchi | G01G 19/08 |
| | | | | 177/136 |
| 2004/0178005 | A1* | 9/2004 | Carlstrom | G01G 19/10 |
| | | | | 177/139 |
| 2009/0119000 | A1 | 5/2009 | Baumann et al. | |
| 2015/0204715 | A1 | 7/2015 | Pita-Gil et al. | |
| 2016/0305814 | A1 | 10/2016 | Pita-Gil | |
| 2020/0173838 | A1* | 6/2020 | Nakayama | G07B 15/063 |

FOREIGN PATENT DOCUMENTS

| | | | | |
|---|---|---|---|---|
| CN | 108025611 A | | 5/2018 | |
| DE | 10029332 A1 | | 1/2002 | |
| DE | 10053603 A1 | | 5/2002 | |
| DE | 102004010559 A1 | | 9/2005 | |
| DE | 102016004721 A1 | | 2/2017 | |
| DE | 102017009146 A1 | | 4/2018 | |
| DE | 102017011753 A1 | | 6/2019 | |
| DE | 102018132697 A1 | | 6/2020 | |
| EP | 656268 B1 | * | 12/1998 | ........... B60C 23/061 |
| EP | 1571014 A2 | | 9/2005 | |
| EP | 1571429 A2 | | 9/2005 | |
| EP | 3466754 A1 | * | 4/2019 | ............. B60Q 1/115 |
| JP | H05231913 A | * | 9/1993 | |
| JP | H08128884 A | | 5/1996 | |
| JP | 08207544 A | * | 8/1996 | |
| JP | H08207544 A | | 8/1996 | |

OTHER PUBLICATIONS

Machine translation of EP-3466754-A1 (Year: 2019).*
Machine translation of JPH05231913A (Year: 1993).*
European Patent Office, Rijswijk, Netherlands, International Search Report of International Application No. PCT/EP2020/060981, Mailed Jul. 24, 2020, 3 pages.
Wabco Gmbh, Company Publication: "ECAS in the Towing Vehicle," 2nd Edition, 2007, 113 pages.

* cited by examiner

METHOD FOR DETERMINING AN AXLE LOAD ON A MECHANICALLY SUSPENDED VEHICLE

TECHNICAL FIELD

The invention relates to a method for determining an axle load on a mechanically suspended vehicle by means of a travel measurement device, an electronic control unit and an algorithm stored in the control unit.

BACKGROUND

The determination of the axle load on a vehicle, in other words, the weight force, given by the sum of the unladen weight and the load weight, on a vehicle axle, is used for displaying and monitoring the load state of the vehicle. Overloading, which compromises safety, and disadvantageous weight distributions in the vehicle are thus to be avoided. In commercial vehicles, the incorporation of overload indicators is already mandatory or will be so in future. Accordingly, the total weight of a vehicle is in future to be recorded with a resolution of 100 kg or better and, when the vehicle is loaded at more than 90% of the permissible total weight, with an accuracy of at least ±5%. In addition, a first weight value is to be available not more than 15 minutes after starting of the vehicle and is thereafter to be newly calculated every 10 minutes or more frequently. Weighing of the vehicle on stationary external axle load scales will thus no longer be sufficient in future to fulfil the associated legal provisions. There is therefore an increasing need for simple and inexpensive weight recording systems on the vehicle side, in other words, incorporated in the vehicle.

Already known are so-called on-board weighing systems, such as, for example, the Air-Weigh™ system, which can be installed and operated in vehicles with steel-spring suspension, with air suspension or with mixed suspension. A disadvantage is that such devices are relatively expensive separate installation systems with which a commercial vehicle can be equipped but which are configured solely for determining the axle load and in particular cannot be integrated into an electronic level control device. Two separate systems are then required for level control and for axle load determination.

A known electronically controlled air suspension system for level control in vehicles is the ECAS (electronically controlled air suspension) system which is described in the company publication of WABCO "ECAS in the towing vehicle", 2nd edition, 2007, and has for a long time been used in commercial vehicles such as trucks, buses and trailer vehicles or also in passenger cars. Such an electronically controlled air suspension system for level control consists substantially of a plurality of adjustable air-spring elements in the form of support bellows, an electronic control unit, which can be incorporated into a data bus system (CAN), a travel measurement device for recording travel variables for level determination in the vehicle, a control valve device for actuating the air-spring elements, and an operating unit for the user.

An electronically controlled level control allows the vehicle level, in other words, the distance of the vehicle superstructure from the vehicle axles and thus the height of the vehicle superstructure above the road, to be purposively lifted, lowered or maintained at the same level in certain situations. For example, the ground clearance can thus be adapted to the ground, the aerodynamics can be improved, or the fuel consumption can be optimized. In commercial vehicles, level control devices are used to maintain a constant level at different loading weights and to facilitate loading and unloading. In addition, in the case of air-suspended commercial vehicles, it is frequently possible to lift one or more auxiliary axles from the ground out of a driving position by deflating the support bellows while at the same time inflating lifting bellows provided for that purpose, in order to distribute the loading weight to the vehicle axles in a variable load ratio, to reduce tire wear and fuel consumption, and to improve the driving behavior and the maneuverability of the vehicle.

The known ECAS system already has extended functions or, in addition to level control of the vehicle superstructure, at least also allows the axle load on the vehicle axles to be determined. From DE 10 2017 011 753 A1, which was not published by the priority date of the present application, a method for the on-board determination of an axle load on a mechanically and/or pneumatically/hydraulically suspended vehicle with an ECAS system is described. In this known method, the axle load on a mechanically suspended vehicle axle is determined by means of a travel measurement device. The axle load on a pneumatically/hydraulically suspended vehicle axle is determined by means of a pressure measurement device.

DE 10 2017 009 146 A1 describes a method for determining the axle load on air-suspended axles of a vehicle, with an air suspension system, in which the pressure, the expansion and the direction of movement of an air-spring element are measured and evaluated. Account is thereby taken of the fact that the relationship between the pressure and the axle load has a hysteresis, since this relationship varies in dependence on the direction of movement of the air-spring element prior to the axle load determination, in other words, whether the air-spring element was inflated and expanded or deflated and contracted prior to the axle load determination. The hysteresis occurs owing to friction effects as the rubber of the bellows of the air-spring elements unfolds and collapses and has the effect that the air-spring elements, at the same chassis height, exert a greater force when the chassis was previously lifted than when the vehicle was previously lowered. A control unit of the air suspension system uses for the axle load determination, according to the direction of movement, two different three-dimensional characteristic diagrams with load-pressure-expansion relationships, in order to achieve a more accurate axle load determination, wherein the previous direction of movement of the air-spring element must, however, first be determined immediately before each axle load determination.

Axle load determination on mechanically suspended vehicle axles is conventionally carried out using travel measurement devices, which are frequently referred to as height sensors. The axle load determination is thereby based on the measurement of a spring travel of a spring element by means of which a vehicle axle or individual vehicle wheels is/are resiliently coupled with a vehicle superstructure. The travel sensor is generally located on the vehicle superstructure in the vicinity of the vehicle axle whose axle load is to be measured. In a type of sensor which is frequently used, the travel sensor is connected to the axle in question via a lever, wherein a rotational movement of the lever is recorded by means of the travel sensor, which is in the form of an angle-of-rotation sensor, and an axle load can be inferred therefrom. Such a measurement device for measuring an axle load on a vehicle is described, for example, in DE 10 2016 004 721 A1.

However, in the case of a steel-spring suspension in the form of leaf springs, the ratio of the change in height to the applied load is not a simple relationship, owing to friction effects, but a hysteresis function. In addition, experience has shown that distortions frequently occur in the mechanical spring elements on loading and unloading of the vehicle, which distortions are not readily resolved when the vehicle is stationary and can thus lead to an incorrect axle load being displayed. Therefore, with a single level measurement, only overloading of the vehicle can be identified with good accuracy. An axle load display over the entire load range, in particular in the low load range, in other words, when the vehicle is loaded only slightly, and an axle load display immediately after loading or unloading is, however, relatively inaccurate. Future requirements, namely the recording of the total weight of the vehicle with a resolution of 100 kg or better and, when the vehicle is loaded at more than 90% of the permissible total weight, with an accuracy of at least ±5%, therefore require further development in the case of axle load determination on such mechanically suspended vehicle axles by means of travel sensors.

SUMMARY

Against this background, the object underlying the invention was to provide a method for determining the axle load on mechanically suspended vehicles which does not have the described disadvantages in terms of the accuracy and reliability of the axle load determination. Preferably, this method is to be suitable for use in a controller of a level control device of a commercial vehicle.

The achievement of this object emerges from the features of the independent claims, while advantageous configurations and further developments of the invention are to be found in the dependent claims.

The invention was based on the finding that a system for determining the axle load on hydraulically or pneumatically suspended axles of a vehicle with a comparatively low outlay in terms of data acquisition and data processing can be adapted to the effect that an accurate and more reliable axle load measurement can also be carried out on mechanically suspended vehicle axles. Moreover, an existing system for level control and for axle load measurement on vehicles with mixed suspension can be further improved and adapted to future requirements.

The invention therefore proceeds from a method for determining an axle load on a mechanically suspended vehicle by means of a travel measurement device, an electronic control unit and an algorithm stored in the control unit.

In order to achieve the stated object the invention provides that a test routine is first carried out on a mechanically suspended vehicle axle, in which test routine a level signal of a travel measurement device arranged on the vehicle axle is acquired and evaluated. To that end, in a loading operation of the vehicle, a loading curve is determined from a plurality of measured values, which loading curve indicates the level measured with the travel measurement device, or another measured variable correlated with the level, in dependence on increasing axle load. Furthermore, in an unloading operation of the vehicle, an unloading curve is determined from a plurality of measured values, which unloading curve indicates the level measured with the travel measurement device, or another measured variable correlated with the level, in dependence on decreasing axle load. There is calculated from the loading curve and the unloading curve an averaged load-travel characteristic curve, the values of which are stored in a non-volatile memory of the control unit. After each start of the vehicle, once a predefined lower travelling speed limit has been exceeded, an axle load determination routine that is repeated cyclically while the vehicle is moving is carried out, in which, during a predefined time period, axle load values are continuously determined with the averaged load-travel characteristic curve. An arithmetic axle load average value is calculated from the axle load values determined during this time period, and this axle load average value is displayed as the current axle load value. This axle load value is retained until overwritten by a new axle load value.

An axle load is understood as being a weight force, given by the sum of the unladen weight and the load weight, on a vehicle axle. The sum of the axle loads of all the vehicle axles gives the total weight of the vehicle.

The term mechanical suspension that is used is usually understood as meaning a steel-spring suspension, for example in the form of a leaf spring. Instead of steel springs, a mechanical suspension can in principle have springs of other materials, such as other alloys or composites. Where steel-suspended axles are mentioned here, this is not to imply any limitation of the invention to mechanical springs made of that material. Where air-suspended vehicle axles are mentioned, the corresponding comments can also be applied to hydraulically suspended axles. A pneumatic/-hydraulic suspension is understood as being a suspension which can be based either on air springs (pneumatic) or on liquid springs (hydraulic).

A level or a vehicle level or a height is here understood as being the distance of a vehicle superstructure of a vehicle from a vehicle axle.

A travel measurement device is understood as being an arrangement for measuring the level at a vehicle axle, which arrangement has at least one travel sensor. The terms travel measurement device, travel sensor and height sensor are used synonymously.

A load-travel characteristic curve is understood as being the relationship between a level measured by a travel measurement device, or another measured variable correlated with the level, and an axle load. A load-travel characteristic curve can illustrate, for example, a relationship between a level and an axle load or the relationship between a spring travel of a spring element and an axle load or a relationship between an excursion of a travel sensor and an axle load.

The term "ECAS", as already mentioned, is an abbreviation for electronically controlled air suspension.

By means of the method according to the invention, an accurate and reliable axle load determination on mechanically suspended vehicle axles by means of a travel sensor is achieved. According to the method, the measured values of a load-travel diagram are first determined on a vehicle axle during loading and unloading of a vehicle. This can take place, for example, by means of axle load scales. To this end, the axle load is increased stepwise until the maximum permissible axle load for the vehicle axle is reached. The deflection travel is measured in each case with the travel sensor. The loading curve is determined from the measured values. The axle load is then reduced again and the rebound is measured until the vehicle is completely unloaded. The unloading curve is determined from these measured values. Owing to the friction-induced resisting force in the spring elements of the vehicle axle, which acts against the deflection or rebound of the spring elements during a load change, there is a difference between the measured axle load and the actual axle load in each of the two curves. The loading curve and the unloading curve therefore describe a hysteresis in the load-travel diagram of the vehicle axle. According to the invention, an algorithm in the control unit calculates an averaged load-travel characteristic curve from the two curves. In this idealized load-travel characteristic curve, the hysteresis is computationally eliminated. The averaged load-travel characteristic curve is then used by an axle load determination routine.

However, a single axle load determination when the vehicle is stationary following a load change by means of the previously recorded load-travel characteristic curve can nevertheless be affected by a relative inaccuracy, if it is assumed that there occur in the individual spring elements of the steel-spring suspension of the vehicle axle distortions which are trapped when the vehicle is stationary. The height sensor thus measures a deflection height which does not correspond to the actual axle load and falsifies the axle load display.

This measurement uncertainty is eliminated according to the invention by means of an axle load determination routine. As soon as the vehicle moves and exceeds a lower travelling speed limit, the algorithm begins the calculation. When the speed limit is exceeded, it is assumed that the distortions in the spring elements resolve or have already been resolved. While the vehicle is moving, a relatively accurate axle load value would thus be obtained with the averaged load-travel characteristic curve from the current value of the level signal with only a single measurement of the height sensor.

The accuracy is increased further in that, over a time period while the vehicle is moving, for example over a period of 10 minutes, an arithmetic average value is formed from the continuously calculated axle load values. This average value indicates the actual axle load with very high accuracy. The cycle can then be carried out repeatedly. During this time, the current axle load value is retained and is overwritten by the new axle load value after the next cycle has been carried out. In this manner, a very accurate current axle load value is always available while the vehicle is moving.

According to another further development of the mentioned method it can be provided that axle load values determined on cornering or during another driving maneuver that causes lateral accelerations of the vehicle superstructure are not taken into account in the calculation of the axle load average value.

In order to reliably identify cornering or another driving maneuver of the vehicle that causes lateral accelerations of the vehicle superstructure, it can be provided that a lateral acceleration signal is continuously acquired and evaluated by means of a lateral acceleration sensor, wherein it is concluded that the vehicle is cornering or making a driving maneuver that has the same effect if the value of the lateral acceleration signal exceeds a predefined lateral acceleration limit value. Such a value which is indicative of cornering or of a lateral acceleration of the vehicle caused in another way can also be determined by means of a comparison of the change over time of speeds of the wheels of one or more vehicle axles.

According to another further development of the method it can be provided that, when the vehicle is stationary, the axle load determination routine is started afresh if an axle load change that exceeds a predefined axle load change limit value is identified. The algorithm can accordingly be so adjusted that, as soon as the vehicle comes to a halt and a significant load change, for example of more than 10%, is identified, the axle load determination routine is started from the beginning. As a result, even when the vehicle is stationary, current axle load values whose accuracy is at least sufficient to reliably detect overloading of the vehicle are available.

According to one embodiment of the invention it can be provided that the test routine for calculating an averaged load-travel characteristic curve can be carried out manually by an operator by means of input and display means and, after a request has been displayed, can be repeated at specifiable time and/or operating-hour-dependent intervals.

It is advantageous if the test routine is repeated at specific time intervals and additionally carried out as required. The load-travel characteristic curve can thus be adapted to changes of the hysteresis due to the ageing of spring elements or following a repair to the suspension. The accuracy and reliability of the determined axle load values can thus be increased. The test routine should be carried out at least each time components of the mechanical suspension are replaced. It is thus ensured that the system is perfectly ready for operation.

According to another further development of the invention it can be provided that the test routine for determining an averaged load-travel characteristic curve is carried out individually for each mechanically suspended vehicle axle of the vehicle. The axle load determination routine can thus be provided with an individual load-travel characteristic curve for each mechanically suspended vehicle axle. The accuracy of the determined axle load values can thus be increased further. In principle, however, it is also possible, with slight losses of accuracy, to use a single load-travel characteristic curve for all the mechanically suspended vehicle axles if structurally identical components for the suspension are fitted for each vehicle axle.

According to another embodiment of the invention it can be provided that the axle load determination routine for determining the axle load is carried out individually for each mechanically suspended vehicle axle of the vehicle that is equipped with a travel measurement device that generates a level signal. It is accordingly advantageous to carry out the method on each mechanically suspended vehicle axle and display the axle load individually. It can thus be ensured that the permissible axle load is observed at each vehicle axle. The driver can recognize if the load moves during the journey, for example because the load is inadequately secured, and can respond if necessary. The operating safety is thus increased further.

The invention relates also to the use of an electronically controlled level control device of a vehicle which is constructed for level control at pneumatically/¬hydraulically suspended vehicle axles and for axle load determination on mechanically suspended vehicle axles and for axle load determination on pneumatically/hydraulically suspended vehicle axles and, by means of an algorithm stored in an electronic control unit of the level control device of the vehicle, can be operated to carry out a method as claimed in at least one of the method claims. The invention relates additionally to a vehicle, such as a commercial vehicle or passenger car, having such a level control device, which vehicle can be operated selectively or cumulatively to carry out a method as claimed in at least one of the method claims.

A method according to the invention can thus advantageously be integrated into a system, such as, for example, ECAS, for determining an axle load on a mechanically and pneumatically/hydraulically mixed-suspended vehicle. The axle load is thereby determined by means of an algorithm stored in an electronic control unit of an electronically controlled level control device of the vehicle. To this end, the control and sensor means provided for level control are installed in the vehicle and/or functionally expanded in such a manner that, in addition to level control, functions for axle load determination on mechanically suspended vehicle axles and for axle load determination on pneumatically/hydraulically suspended vehicle axles are available. In this system, the axle load determination on a mechanically suspended vehicle axle is carried out by means of a travel measurement device, and the axle load determination on a pneumatically/hydraulically suspended vehicle axle is carried out by means of a pressure measurement device.

In order that malfunctions are avoided, it is possible in the case of the axle load determination in vehicles with mixed suspension to carry out a plausibility check in order to distinguish mechanically suspended axles from pneumatically suspended axles. For this purpose, the presence of support bellows, pressure sensors and associated valve devices on air-suspended vehicle axles that are present can be verified, for example.

Finally, it should be mentioned that the method according to the invention, in addition to determining the axle load on mechanically suspended vehicle axles, can in principle also be carried out on air-suspended axles, so that permanently up-to-date, accurate information about the axle load can be made available for all the vehicle axles regardless of the type of suspension. To this end, based on the test routine already described for determining an averaged load-travel characteristic curve of a travel sensor, an averaged load-pressure characteristic curve of a pressure sensor can be generated and the values thereof can be stored. In such a load-pressure characteristic curve of an air-suspended vehicle axle, a hysteresis in the air-spring elements can be taken into account. A suitable test routine can be carried out, for example, on the basis of a routine known from DE 10 2004 010 559 A1 for determining an axle load characteristic curve of an air-suspended vehicle. A suitable axle load determination routine for determining the axle load on air-suspended vehicle axles can be carried out analogously to the axle load determination routine according to the invention already described above.

The invention will be explained in greater detail hereinbelow with reference to an exemplary embodiment illustrated in the accompanying drawings.

BRIEF DESCRIPTION OF THE DRAWINGS

In the drawings,

FIG. 3b shows a first subroutine of a method according to FIG. 3a, and FIG. 3c shows a second subroutine of a method according to FIG. 3a.

DETAILED DESCRIPTION OF THE DRAWINGS

Figure 1:
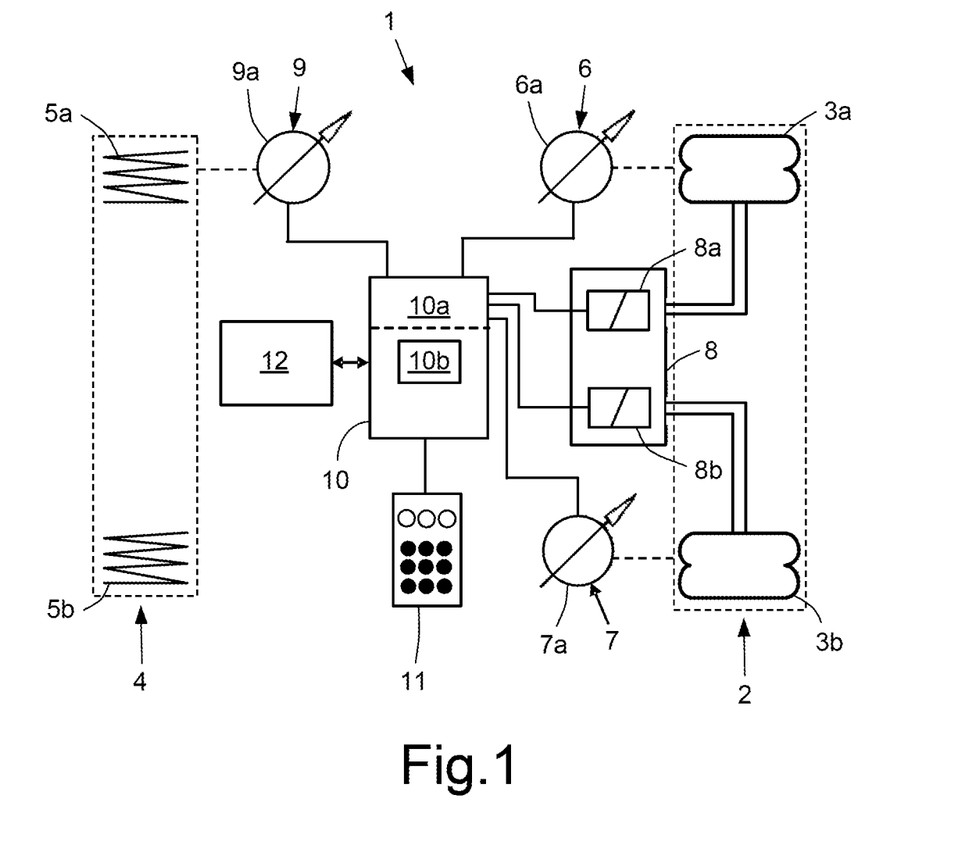
FIG. 1 shows a level control device, illustrated in schematic simplified form, which is configured for axle load determination and for level control on a vehicle equipped with mechanically and pneumatically suspended axles.

A leveling device 1, illustrated in simplified form in FIG. 1, of a vehicle, such as an ECAS system of a truck, for example, has two adjustable air-spring elements 3a, 3b in the form of support bellows for resiliently supporting a vehicle superstructure, not shown, relative to an air-suspended first vehicle axle 2. A mechanically suspended second vehicle axle 4, on the other hand, is supported relative to the vehicle superstructure via two steel-spring elements 5a, 5b. The steel-spring elements 5a, 5b are indicated only symbolically in FIG. 1 as helical compression springs. They can be helical compression springs or leaf springs or spring packs composed of a plurality of individual springs. The mechanical suspension can thus be helical compression suspension or leaf suspension. The vehicle axles 2, 4, regardless of their suspension, can each be configured as a front axle or as a rear axle. The truck according to FIG. 1 is to be understood as being only an example of a vehicle. The mentioned vehicle axles 2, 4 can likewise be arranged on a trailer vehicle or on a semitrailer.

Associated with the pneumatically/hydraulically suspended, here air-suspended, vehicle axle 2 are a first travel measurement device 6 having at least a first travel sensor 6a for acquiring travel quantities for level determination, a pressure measurement device 7 having at least one pressure sensor 7a for acquiring pressure values for an axle load determination on this vehicle axle 2, and a control valve device 8, in the form of a valve circuit, having a control valve 8a, 8b in the form of a solenoid valve for each air-spring element 3a, 3b. The control valve device 8 is switchably pneumatically connected to the air-spring elements 3a, 3b and has a compressed air port, not shown in greater detail. Associated with the mechanically suspended, here steel-spring-suspended, vehicle axle 4 is a second travel measurement device 9 having at least a second travel sensor 9a for an axle load determination on this vehicle axle 4.

There is additionally arranged an electronic control unit 10 for evaluating the measured travel values and the measured pressure values and for controlling the air-spring elements 3a, 3b for the adjustment of a level between the vehicle superstructure and the air-suspended vehicle axle 2. The electronic control unit 10 has an electrical interface 10a which is configured to receive and transmit measured signals of sensors. The electronic control unit 10 additionally has a non-volatile memory 10b in which the values of a plurality of characteristic curves can be stored. Moreover, an operating unit 11 for a particular operator is connected in terms of signaling to the control unit 10. At the operating unit 11, the operator can enter various settings and carry out routines and calibrations. The valve circuit 8 and the two travel measurement devices 6, 9 and also the pressure measurement device 7 are likewise connected in terms of signaling to the control unit 10. The control unit 10 has a CAN controller via which the control unit 10 is connected to a CAN bus 12. The CAN controller controls interrupt requests and regulates the data transfer. The configuration of a CAN bus in a vehicle and the connection of various bus participants to the CAN bus are known to the person skilled in the art.

The first and second travel sensors 6a, 9a are each secured to the vehicle superstructure in the vicinity of their associated vehicle axle 2, 4 and are connected to the vehicle axle 2, 4 via a respective lever system, not shown. The travel sensors 6a, 9a each have an angle-of-rotation sensor, not shown, which acquires the angular position of the mentioned lever system. The rotational movement of the lever system can be converted within the travel sensor 6a, 9a into a linear movement, for example in the form of the plunging of an armature into a coil, wherein, during the plunging movement of the ferromagnetic armature into the stationary coil, a travel-dependent phase shift between the current and the voltage occurs, which is made available as an output signal, which the control unit 10 receives. From this signal, an actual level of the distance between the vehicle axle 2, 4 in question and the vehicle superstructure can be determined. The value of the actual level can be used for level control at the air-suspended vehicle axle 2. Alternatively, travel sensors based on other measurement principles can be arranged at the two vehicle axles 2, 4 for detecting the actual level.

Level control of an air suspension with such a system is known per se. Conventionally, a travel sensor for level control acquires the distance between the vehicle axle and the vehicle superstructure at specific time intervals, for example every 0.1 seconds. The determined measured value is the actual value of a control circuit and is forwarded to the control unit 10. In the control unit 10, this actual value is compared with a setpoint value stored in the control unit 10. If there is an impermissible difference between the actual value and the setpoint value, a control signal is transmitted from the control unit 10 to a solenoid valve. The solenoid valve then activates the support bellows in dependence on this control signal and inflates or deflates it. As a result of the pressure change in the support bellows, the distance between the vehicle axle and the vehicle superstructure also changes. The distance is measured again by the associated travel sensor and the cycle starts over.

Level control of an air suspension with such a system is not relevant for the invention per se and therefore does not have to be described further in detail. A method for axle load determination on a vehicle with mixed suspension according to FIG. 1 has already been described in DE 10 2017 011 753 A1, which was not published by the priority date of the present application, as mentioned above. The following remarks are therefore limited to the sequence of a method according to the invention for determining an axle load on the mechanically suspended vehicle axle 4.

According to the method, the value of the actual level acquired by the travel sensor 9a is used for axle load determination on the mechanically suspended vehicle axle 4. The axle load determination on the mechanically suspended vehicle axle 4 in principle utilizes the simple relationship that the weight force on the vehicle axle 4 is determined from the spring constant of the spring element 5a, 5b and the measured deflection. However, such a mechanical suspension is subject to a hysteresis, as is explained hereinbelow.

Figure 2A:
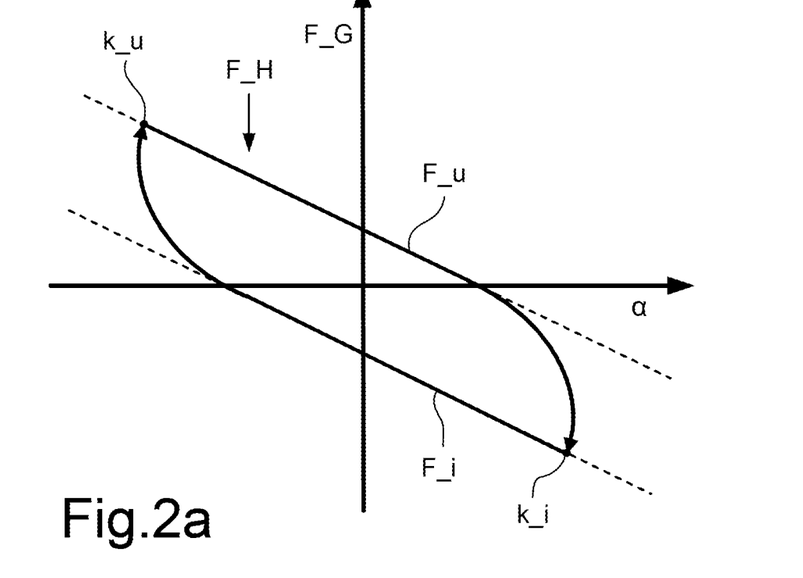
FIG. 2a is a load-travel diagram of a travel sensor according to FIG. 1 on a mechanically suspended vehicle axle with a hysteresis.

FIG. 2a shows by way of example such a hysteresis F_H of a steel-spring suspension of a mechanically suspended vehicle axle 4. In the diagram, the axle load F_G on the vehicle axle 4 is illustrated via the lever excursion a of a lever of the associated travel sensor 9a. The lever excursion a is at its greatest when the vehicle is unloaded and reduces as the deflection increases corresponding to the increasing axle load F_G. The hysteresis F_H is described by a loading curve F_i and an unloading curve F_u. A loading operation thus begins at a lower first load point k_i, at which only the unladen weight of the vehicle is on the vehicle axle 4. As the axle load F_G increases, the loading curve F_i is initially linear, then merges into a progressive curve and ends at a maximum axle load F_G at an upper second load point k_u. An unloading operation does not follow the same curve F_i back but describes the unloading curve F_u. Owing to frictional forces in the mechanical suspension, the deflection along the spring travel lags behind the increasing axle load F_G slightly on loading of the vehicle. On unloading, the rebound lags behind the decreasing axle load F_G slightly. The hysteresis F_H illustrated in FIG. 2a is thus produced.

Figure 2B:
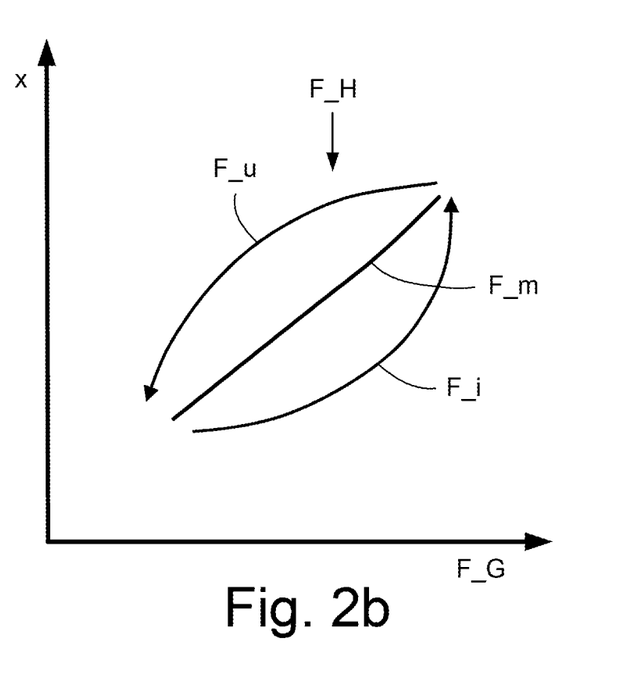
FIG. 2b shows another illustration of a load-travel diagram of the travel sensor according to FIG. 1 with an averaged load-travel characteristic curve.

FIG. 2b shows another illustration of the hysteresis F_H in a load-travel diagram of the travel sensor 9a. In the diagram, the spring travel x at the mechanically suspended vehicle axle 4 is plotted over the axle load F_G. The level of the vehicle can be derived from the spring travel x and vice versa. In FIG. 2b there are again illustrated the loading curve F_i, along which the vehicle superstructure is increasingly deflected as the axle load F_G increases, and the unloading curve F_u, along which the vehicle superstructure increasingly rebounds as the axle load F_G decreases. From the two last-mentioned curves F_i, F_u, an averaged load-travel characteristic curve F_m is calculated within a test routine described hereinbelow, by means of an algorithm stored in the control unit 10. In the present example, the averaged load-travel characteristic curve F_m is approximately linear.

The test routine can be carried out, for example, at a test station with a stationary weight acquisition system. For this purpose, the vehicle is driven onto axle load scales for the recording of a load-travel diagram on a vehicle axle, for example the vehicle axle 4 according to FIG. 1, wherein the wheels of the vehicle axle 4 in question each stand on a weighing plate of the axle load scales. After the axle-specific unladen weight of the vehicle, in other words, the load on the vehicle axle 4 when the vehicle is unloaded, has first been determined, the axle load is increased stepwise by the application of weight plates of known mass until the permissible axle load is reached. For this purpose, the deflection is measured in each case with the associated travel sensor 9a. By means of a plurality of such measured values, the loading curve F_i is determined. The axle load is then reduced until the vehicle is completely unloaded. The measured travel values thereby obtained are used to determine the unloading curve F_u. Owing to the friction-induced resisting force in the spring elements 5a, 5b of the vehicle axle 4, which acts against the deflection or rebound of the spring elements in the case of a load change, there is a difference between the measured axle load and the actual axle load in the comparison of the two curves F_i and F_u. The loading curve F_i and the unloading curve F_u therefore describe a hysteresis F_H in the load-travel diagram of the vehicle axle 4 according to FIG. 2a and FIG. 2b. In the averaged load-travel characteristic curve F_m calculated by the described algorithm, the hysteresis is computationally eliminated. The averaged load-travel characteristic curve F_m is then used by an axle load determination routine described hereinbelow.

Figure 3A:
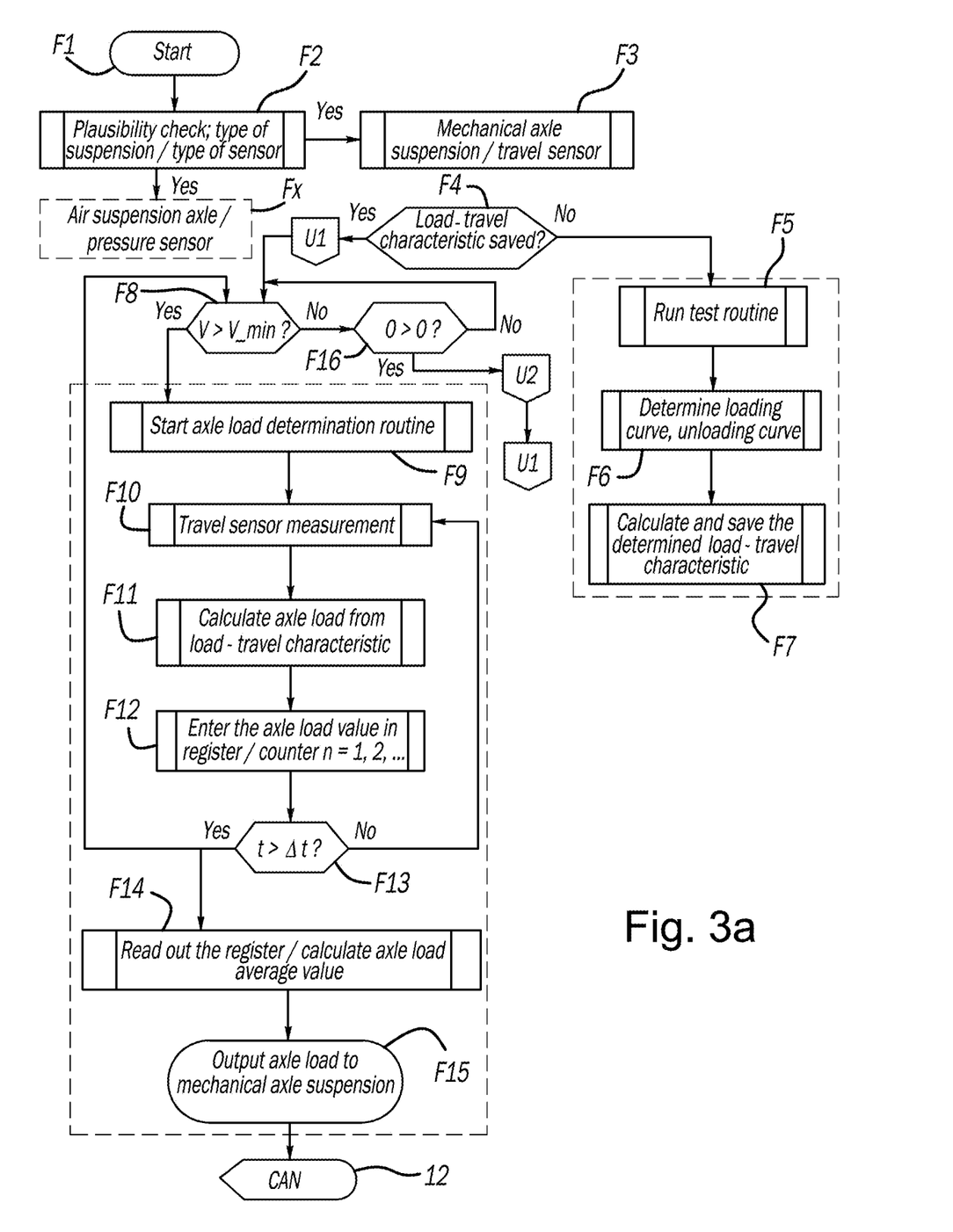
FIG. 3a is a flow diagram of a method according to the invention for determining an axle load on a steel-spring-suspended vehicle axle of a vehicle with mixed suspension according to FIG. 1.
Figure 3B:
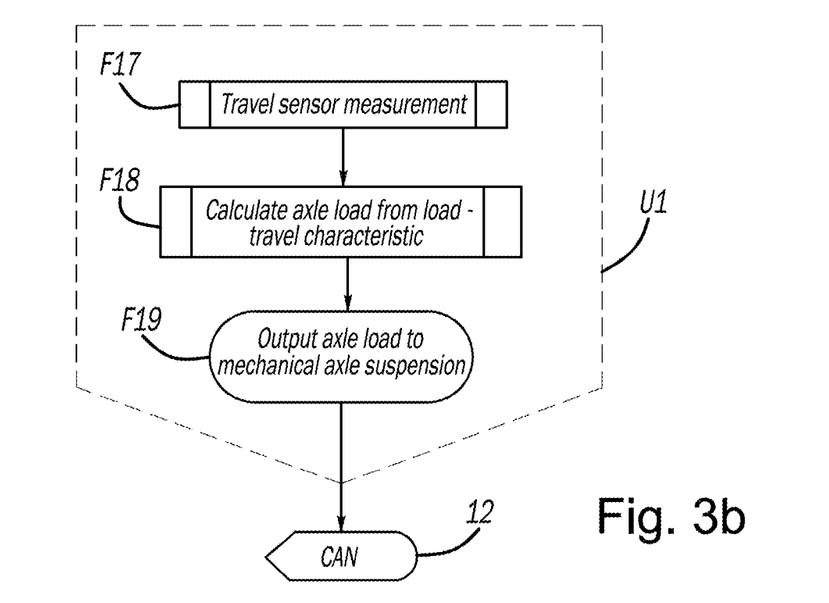
Figure 3C:
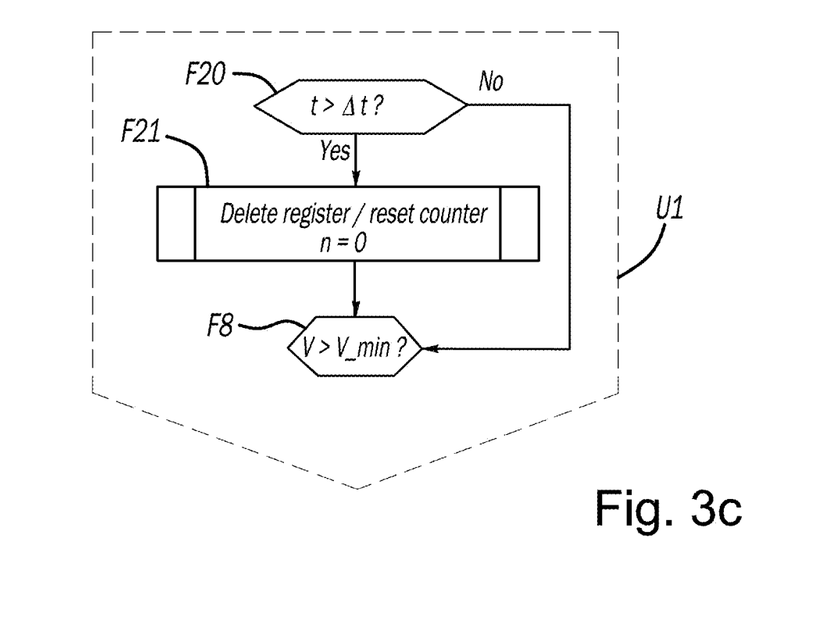

FIG. 3a, FIG. 3b and FIG. 3c show a flow diagram with function blocks F1 to F21 of method steps for determining an axle load on the mechanically suspended vehicle axle 4 according to FIG. 1. The method according to FIG. 3a thus starts with the activation of the level control device 1, for example when an ignition system of the vehicle is switched on in a first function block F1. In the case of a vehicle with mixed suspension as in the present example according to FIG. 1, an axle-specific plausibility check is first carried out in function block F2, on the basis of which the program splits into two program branches. An axle-specific plausibility check for identifying the type of suspension and a program branch for axle load determination on the air-suspended vehicle axle 2 are already described per se in the mentioned DE 10 2017 011 753 A1 and are not illustrated further here. In FIG. 3a, the identification of an air-suspended vehicle axle 2 is indicated only by a function block Fx. By contrast, a new, second program branch according to the invention is presented here, with which the axle load on the mechanically suspended vehicle axle 4 is determined with greater accuracy. In a purely mechanically suspended vehicle, this program branch can be an independent routine.

If, according to FIG. 3a, the presence of a mechanically suspended vehicle axle 4 and a travel sensor signal of the associated travel sensor 9a was identified by means of the plausibility check in function block F2 and specified in function block F3, then the presence of an averaged load-travel characteristic curve F_m for the vehicle axle 4 according to FIG. 2b stored in the memory 10b of the control unit 10 is queried in function block F4. If the load-travel characteristic curve F_m is not yet present, a test routine as already described must first be carried out. The test routine starts in function block F5. In function block F6, the loading curve F_l and the unloading curve F_u are determined. In function block F7, the required load-travel characteristic curve F_m is calculated therefrom and stored in the memory 10b. The method then returns from function block F7 back to the start of function block F4.

If a load-travel characteristic curve F_m was detected in function block F4, a first subroutine U1 shown in FIG. 3b is first carried out while the vehicle is stationary. In the subroutine U1, the travel sensor signal, or the excursion a of the travel sensor 9a according to FIG. 2a, is read out in function block F17 according to FIG. 3b, and the deflection or rebound of the vehicle superstructure along the spring travel x is determined therefrom. In function block F18, a current axle load value on the mechanically suspended vehicle axle 4 is determined by means of the averaged load-travel characteristic curve F_m, which is stored in the memory 10b of the control unit 10 and in which the measured actual level, or the spring travel, is correlated with the axle load. This axle load value is outputted in function block F19 as the current axle load F_G on the mechanically suspended vehicle axle F4 and sent to the CAN bus 12.

The subroutine U1 serves as a basic display of the axle load, or of a total weight of the vehicle derivable therefrom, which can be retrieved at any time. Axle load information, or weight information, is thus available to the driver, in particular before the start of a journey during loading or unloading of the vehicle. However, since it can be assumed that, when the vehicle is stationary, possible distortions have occurred in the spring elements 5a, 5b, which can be in the form of, for example, leaf spring packs, which distortions have not resolved, the accuracy of the displayed axle load information may be lower compared to the axle load information obtained by an axle load determination routine described hereinbelow. In this respect, this subroutine U1 is an auxiliary routine of the actual method. The current axle load information determined in this manner is therefore displayed to the driver with a corresponding note.

After the subroutine U1 has been carried out, with the generation of the basic axle load display of limited accuracy, the travelling speed v of the vehicle is determined in function block F8. If the vehicle has started to move and if the travelling speed v has exceeded a lower limit v_min, for example 2 km/h, an axle load determination routine starts in function block F9.

In function block F10, the travel sensor signal, or the excursion a of the travel sensor 9a according to FIG. 2a, is determined, and the deflection or rebound of the vehicle superstructure along the spring travel x is determined therefrom. In function block F11, a current axle load value on the mechanically suspended vehicle axle 4 is determined by means of the averaged load-travel characteristic curve F_m, which is stored in the memory 10b of the control unit 10 and in which the measured actual level, or the spring travel, is correlated with the axle load, is recorded in a volatile register memory in function block F12 and provided with a counting number n of a register counter.

Within a time period $\Delta t$ specified in function block F13, new axle load values are continuously determined and recorded according to function blocks F10 to F12. Axle load values measured while cornering are not entered into the register. To this end, the lateral acceleration of the vehicle is constantly measured by means of a lateral acceleration sensor that is present, and axle load values at lateral accelerations above a predefined limit value, for example 0.3 m/s2, are purposively not used. When the predetermined time period $\Delta t$, for example 10 minutes, has elapsed, the arithmetic average value of the recorded axle load values is formed in function block F14 and the axle load value resulting therefrom is stored.

This average value is outputted in function block F15 as the current axle load F_G on the mechanically suspended vehicle axle F4 and sent to the CAN bus 12. At the same time, the axle load determination routine is started again via the travelling speed query in function block F8 and is repeated cyclically, so that while the vehicle is moving, in the present case every 10 minutes, new current axle load information is available. Old axle load information is overwritten. The axle load information for the mechanically suspended vehicle axle 4 can be displayed to the driver on a display and/or used by other electronic control systems. Accordingly, accurate axle-specific axle load information for any number of mechanically suspended vehicle axles can be generated and displayed, and the total weight of the vehicle can be determined with a high degree of accuracy from the number of vehicle axles or from the sum of the axle loads.

If the travelling speed v in function block F8 has not yet exceeded the travelling speed lower limit v_min or if the vehicle is still stationary after it has been moving, the current counting number n is queried in function block F16. The register counter of the volatile register memory is always reset to the value zero when the ignition system is switched on and is increased only by the axle load determination routine after the vehicle has started moving. If a higher counting number n>0 is recorded in function block F16, then the axle load determination routine has been carried out at least once while the vehicle was moving. If the speed query in function block F8 establishes that the travelling speed lower limit v_min has not been exceeded and the counter query in function block F16 establishes that the axle load determination routine has already been carried out, the vehicle has accordingly come to a stop after it has started moving. The counter query in function block F8 in this case branches to a second subroutine U2 illustrated in FIG. 3c.

In subroutine U2, a load change $\Delta F\_G$ is queried in function block F20. If an axle load change $\Delta F\_G$ of more than a predefined axle load change limit value $\Delta F\_G\_lim$, for example 10%, is identified, the register is deleted or the counter is reset to the value zero in function block F21. The currently displayed axle load F_G is no longer valid due to the load change. In order to generate a new current axle load value by means of the axle load routine, the method sequence therefore jumps back to the speed query in function block F8 again. Until the vehicle starts moving again and a new axle load value is determined, axle load information of reduced accuracy can as an alternative be produced and displayed to the driver by means of the first subroutine U1 according to FIG. 3b, as already described. If the vehicle has come to a halt but the load, or the loading, of the vehicle does not change, or a load change remains below the axle load change limit value $\Delta F\_G\_lim$, the current displayed axle load display can be retained until a new axle load value is determined while the vehicle is moving.

In summary, it can thus be concluded that very accurate current axle load information is always made available to the driver while the vehicle is moving by means of the averaged load-travel characteristic curve F_m, which eliminates errors in the axle load determination due to the loading-unloading hysteresis, and by means of the averaged axle load value that is generated, which eliminates errors in the axle load determination due to spring distortions that are present while the vehicle is stationary. While the vehicle is stationary, the driver at least has available axle load information with slightly lower but, owing to the averaged load-travel characteristic curve F_m, nevertheless still good accuracy.

What is claimed is:

1. A method for determining an axle load on a mechanically suspended vehicle via a travel measurement device (9), an electronic control unit (10) and an algorithm stored in the control unit (10), the method comprising:
    first carrying out a test routine with respect to a mechanically suspended vehicle axle (4) by acquiring and evaluating a level signal of a travel measurement device (9) arranged on the vehicle axle (4), including the following steps:
        determining, in a loading operation of the vehicle, a loading curve (F_i) is determined from a plurality of measured values, the loading curve indicating a level measured with the travel measurement device (9), or another measured variable correlated with the level,
        determining, in an unloading operation of the vehicle, an unloading curve (F_u) from a plurality of measured values, the unloading curve indicating the level measured with the travel measurement device (9), or another measured variable correlated with the level,
        calculating, from values of the loading curve (F_i) and of the unloading curve (F_u) an averaged load-travel characteristic curve (F_m), and
        storing values of the averaged load-travel characteristic curve (F_m) in a non-volatile memory (10b) of the control unit (10), and
    after each start of the vehicle, and after a predefined lower traveling speed limit (v_min) that is greater than zero has been exceeded, cyclically repeating an axle load determination routine while the vehicle is moving at a vehicle speed that is greater than the lower traveling speed limit that is greater than zero, including the following steps:
        continuously determining, during a first predefined time period ($\Delta t$) defined by a given predetermined quantity of time, axle load values with the averaged load-travel characteristic curve (F_m), and calculating a first arithmetic axle load average value from the axle load values determined during the first predetermined time period ($\Delta t$),
        continuously determining, during a second predefined time period ($\Delta t$) defined by the given predetermined quantity of time, axle load values with the averaged load-travel characteristic curve (F_m), and calculating a second arithmetic axle load average value from the axle load values determined during the second predetermined time period ($\Delta t$), and
        displaying the first arithmetic axle load average value as a current axle load value, wherein the current axle load value remains valid until overwritten by the second arithmetic axle load average value.

2. The method as claimed in claim 1, further comprising:
    restarting the axle load determination routine when the vehicle is stationary and an axle load change ($\Delta F\_G$) is identified that exceeds a predefined axle load change limit value ($\Delta F\_G\_lim$).

3. The method as claimed in claim 1, wherein the test routine for calculating the averaged load-travel characteristic curve (F_m) is initiated manually by an operator.

4. The method as claimed in claim 1, wherein the mechanically suspended vehicle axle is one of a plurality of mechanically suspended vehicle axles of the vehicle, wherein the test routine for calculating the averaged load-travel characteristic curve (F_m) is carried out individually for each mechanically suspended vehicle axle (4) of the plurality of mechanically suspended vehicle axles (4).

5. The method as claimed in claim 1, wherein the mechanically suspended vehicle axle is one of a plurality of mechanically suspended vehicle axles (4) equipped with a travel measurement device (9) generating a level signal, wherein the axle load determination routine for determining the axle load is carried out individually for each mechanically suspended vehicle axle (4) of the plurality of mechanically suspended vehicle axles (4).

6. A non-volatile computer memory storing a computer program that, when executed, causes an electronic control unit (10) of a level control device of a vehicle to carry out the method as claimed in claim 1.

7. A vehicle comprising an electronically controlled level control device (1) for axle load determination on a mechanically suspended vehicle axle (4), wherein the level control device (1) is also configured for level control at a pneumatically or hydraulically suspended vehicle axle (2) of the vehicle and for axle load determination on the pneumatically or hydraulically suspended vehicle axle (2), wherein the vehicle is configured to be operated selectively or cumulatively to carry out the method as claimed in claim 1.

8. The method as claimed in claim 1, further comprising:
    disregarding, in calculating the axle load average value, such axle load values that have been determined during cornering or during another driving maneuver causing lateral accelerations of the vehicle.

9. The method as claimed in claim 8, further comprising:
    identifying cornering or another driving maneuver of the vehicle that causes lateral accelerations of the vehicle by continuously acquiring and evaluating a lateral acceleration signal from a lateral acceleration sensor, and
    concluding that that the vehicle is cornering or making a driving maneuver causing lateral accelerations of the vehicle if the lateral acceleration signal represents an acceleration value that exceeds a predefined lateral acceleration limit value.

10. A method for determining an axle load on a mechanically suspended vehicle via a travel measurement device (9), an electronic control unit (10) and an algorithm stored in the control unit (10), the method comprising:
    first carrying out a test routine with respect to a mechanically suspended vehicle axle (4) by acquiring and evaluating a level signal of a travel measurement device (9) arranged on the vehicle axle (4), including the following steps:
        determining, in a loading operation of the vehicle, a loading curve (F_i) is determined from a plurality of measured values, the loading curve indicating a level measured with the travel measurement device (9), or another measured variable correlated with the level, determining, in an unloading operation of the vehicle, an unloading curve ($F\_u$) from a plurality of measured values, the unloading curve indicating the level measured with the travel measurement device (9), or another measured variable correlated with the level, calculating, from values of the loading curve ($F\_i$) and of the unloading curve ($F\_u$) an averaged load-travel characteristic curve ($F\_m$), and storing values of the averaged load-travel characteristic curve ($F\_m$) in a non-volatile memory (10b) of the control unit (10), and after each start of the vehicle, and after a predefined lower traveling speed limit ($v\_min$) that is greater than zero has been exceeded, cyclically repeating an axle load determination routine while the vehicle is moving at a vehicle speed that is greater than the lower traveling speed limit that is greater than zero, including the following steps:

continuously determining, during a first predefined time period ($\Delta t$) defined by a given predetermined quantity of time, axle load values with the averaged load-travel characteristic curve ($F\_m$), and calculating a first arithmetic axle load average value from the axle load values determined during the first predetermined time period ($\Delta t$), continuously determining, during a second predefined time period ($\Delta t$) defined by the given predetermined quantity of time, axle load values with the averaged load-travel characteristic curve ($F\_m$), and calculating a second arithmetic axle load average value from the axle load values determined during the second predetermined time period ($\Delta t$), and displaying the first arithmetic axle load average value as a current axle load value, wherein the current axle load value remains valid until overwritten by the second arithmetic axle load average value;

disregarding, in calculating the first and second arithmetic axle load average value, such axle load values that have been determined during cornering or during another driving maneuver causing lateral accelerations of the vehicle;

identifying cornering or another driving maneuver of the vehicle that causes lateral accelerations of the vehicle by continuously acquiring and evaluating a lateral acceleration signal from a lateral acceleration sensor, and concluding that that the vehicle is cornering or making a driving maneuver causing lateral accelerations of the vehicle if the lateral acceleration signal represents an acceleration value that exceeds a predefined lateral acceleration limit value.

11. The method as claimed in claim 10, further comprising:

restarting the axle load determination routine when the vehicle is stationary and an axle load change ($\Delta F\_G$) is identified that exceeds a predefined axle load change limit value ($\Delta F\_G\_lim$).

12. The method as claimed in claim 10, wherein the test routine for calculating the averaged load-travel characteristic curve (Fm) is initiated manually by an operator.

13. The method as claimed in claim 10, wherein the mechanically suspended vehicle axle is one of a plurality of mechanically suspended vehicle axles of the vehicle, wherein the test routine for calculating the averaged load-travel characteristic curve ($F\_m$) is carried out individually for each mechanically suspended vehicle axle (4) of the plurality of mechanically suspended vehicle axles (4).

14. The method as claimed in claim 10, wherein the mechanically suspended vehicle axle is one of a plurality of mechanically suspended vehicle axles (4) equipped with a travel measurement device (9) generating a level signal, wherein the axle load determination routine for determining the axle load is carried out individually for each mechanically suspended vehicle axle (4) of the plurality of mechanically suspended vehicle axles (4).

15. The non-volatile computer memory storing a computer program that, when executed, causes the electronic control unit (10) of the level control device of the vehicle to carry out the method as claimed in claim 10.

16. A vehicle comprising an electronically controlled level control device (1) for axle load determination on a mechanically suspended vehicle axle (4), wherein the level control device (1) is also configured for level control at a pneumatically or hydraulically suspended vehicle axle (2) of the vehicle and for axle load determination on the pneumatically or hydraulically suspended vehicle axle (2), wherein the vehicle is configured to be operated selectively or cumulatively to carry out the method as claimed in claim 10.

* * * * *